US012624158B2

(12) United States Patent
Morschhäuser et al.

(10) Patent No.: US 12,624,158 B2
(45) Date of Patent: May 12, 2026

(54) POLYESTERS COMPRISING STRUCTURAL UNITS WITH SULFONATE GROUPS, AND POLYALKOXY ETHER END GROUPS, DETERGENTS, AND CLEANING AGENTS COMPRISING THESE AND THEIR USE

(71) Applicant: Catexel GmbH, Wiesbaden (DE)

(72) Inventors: Roman Morschhäuser, Mainz (DE); Judith Preuschen, Sörgenloch (DE); Stefan Riegelbeck, Frankfurt am Main (DE); Niklas Diekhans, Bischofsheim (DE); Rolf Ludwig, Eppstein (DE); Said Kchirid, Heidenbrücken (DE)

(73) Assignee: Catexel GmbH (DE)

( * ) Notice: Subject to any disclaimer, the term of this patent is extended or adjusted under 35 U.S.C. 154(b) by 387 days.

(21) Appl. No.: 18/211,491

(22) Filed: Jun. 19, 2023

(65) Prior Publication Data

US 2023/0406999 A1 Dec. 21, 2023

(30) Foreign Application Priority Data

Jun. 21, 2022 (DE) ..................... 10 2022 002 248.6

(51) Int. Cl.
*C08G 63/06* (2006.01)
*C08G 63/688* (2006.01)
*C11D 1/02* (2006.01)
*C11D 3/37* (2006.01)
*C11D 17/00* (2006.01)

(52) U.S. Cl.
CPC ......... *C08G 63/065* (2013.01); *C08G 63/688* (2013.01); *C11D 1/02* (2013.01); *C11D 3/3715* (2013.01); *C11D 17/0073* (2013.01); *C11D 2111/12* (2024.01)

(58) Field of Classification Search
CPC ... C11D 3/3715; C11D 3/3761; C11D 3/3765; C11D 17/0086; C11D 17/044; C11D 2111/12
See application file for complete search history.

(56) References Cited

U.S. PATENT DOCUMENTS 4,877,896 A * 10/1989 Maldonado .......... C11D 3/0036 510/528
4,976,879 A * 12/1990 Maldonado .......... C11D 3/0036 510/528
6,255,274 B1 * 7/2001 Becherer .................. C11D 3/37 510/357
6,498,227 B1 * 12/2002 Horie .................. D06M 13/285 528/193
10,351,802 B2 * 7/2019 Cohrs ................ C08G 63/6856
2003/0220456 A1 * 11/2003 Kaku ...................... C08L 67/02 525/419
2009/0036641 A1 * 2/2009 Lang .................... C08G 63/668 528/295
2011/0095109 A1 * 4/2011 Borchers ................ C08G 63/89 241/25
2012/0065119 A1 * 3/2012 Morschhaeuser ...... C08G 63/20 510/400
2012/0322970 A1 * 12/2012 Peters ...................... C07C 67/08 528/308.1
2013/0045912 A1 * 2/2013 Morschhaeuser .... C11D 3/3715 510/400
2016/0326337 A1 * 11/2016 Farrugia ............ G03G 9/09371
2017/0275420 A1 * 9/2017 Barreleiro ............ C08G 63/672

* cited by examiner

*Primary Examiner* — Charles I Boyer
(74) *Attorney, Agent, or Firm* — M. Susan Spiering; Oehoa & Associates, P.C.

(57) ABSTRACT

Disclosed are polyesters containing structural units corresponding to formula (I) or to formula (II) or to formulae (I) and (II), structural units of formula (III) or of formula (IV) or of formulae (III) and (IV), and optionally structural units of the formula (V)

$$—CO—R^1—CO—O—C_2H_4—O— \quad (I),$$

$$—CO—R^1—CO—O—(C_3H_6—O)— \quad (II),$$

$$—CO—R^2—CO—O—C_2H_4—O— \quad (III),$$

$$—CO—R^2—CO—O—(C_3H_6—O)— \quad (IV),$$

$$—CO—R^3—CO—O—R^4—O— \quad (V),$$

as well as nonionic endgroups of the formula (VI), and optionally nonionic endgroups of the formula (VII)

$$—CO—(O—C_2H_4—)_n—OR^5 \quad (VI),$$

$$—CO—OR^6 \quad (VII).$$

In these structural units and endgroups $R^1$ to $R^6$ are selected organic radicals and n is a number between 30 and 500. The polyesters according to the invention are characterized by very good soil release properties, can be readily stored in detergent and cleaning agent formulations and can be used as soil-release polymers.

19 Claims, No Drawings

POLYESTERS COMPRISING STRUCTURAL UNITS WITH SULFONATE GROUPS, AND POLYALKOXY ETHER END GROUPS, DETERGENTS, AND CLEANING AGENTS COMPRISING THESE AND THEIR USE

CLAIM FOR PRIORITY

This application is a national phase application of DE 10 2022 002 248.6 FILED Jun. 21, 2022. The priority of DE 10 2022 002 248.6 is hereby claimed and its disclosure incorporated herein by reference.

TECHNICAL FIELD

The invention relates to selected polyesters for use in detergents and cleaning agents, which are characterized by very good soil release properties, allow the preparation of storage-stable liquid and solid formulations, are readily soluble in water, have low hygroscopicity and a solid, non-sticky consistency.

BACKGROUND OF THE INVENTION

The use of polyesters in detergents to improve soil release from textiles, reduce resoiling, protect fibers under mechanical stress and provide fabrics with an anti-crease effect is well known. These polyesters are known as SRP grades. A large number of polyester types and their use in detergents and cleaning agents are described in the patent literature. In addition to polyesters built up from exclusively non-ionic assemblies, polyesters are also used, some of which have anionic units. These anionic polyesters are actually preferred for reasons of efficiency; however, such polyesters, especially in liquid formulations such as in liquid detergents, tend to form deposits during storage . . . .

U.S. Pat. No. 4,702,857 A discloses block copolyesters with anionic groups as soil release polymers.

U.S. Pat. No. 4,427,557 discloses further SRPs with anionic groups. These are capped with low molecular weight nonionic end groups.

SRPs with nonionic and ionic groups in the polymer backbone and with nonionic end groups are known from several patent documents.

For example, WO 2008/110318 A2 describes anionic SRPs that have a softening point above 40° C., are derived from terephthalic acid, sulfoisophthalic acid and glycols, such as ethylene glycol and/or propylene glycol, and have end groups derived from alkylene glycol ethers. These polyesters are readily soluble in water, exhibit good soil release properties and can be readily incorporated into solid detergents and cleaning agents. The chain length of the alkylene glycol ethers used ranges from 1 to 200 repeating units. However, the preference is in the lower range corresponding to 1 to 20 repeat units; this corresponds to an average molecular weight of up to about 1000 for polyalkylene glycol ethers. According to the execution examples, polyalkylene glycol ethers with three to eight repeat units are used and the proportion by weight of the end groups, based on the total weight of the polyester, is less than 30%.

From WO 1995/02030 A1 detergent compositions are known which contain selected SRP. These SRPs contain terephthalic acid glycol units and sulfoisophthalic acid glycol units, with ethylene glycol and or propylene glycol as alkylene glycols and selected end groups. End groups include alkoxylated hydroxyethane sulfonates, sulfoaroyl units, poly(oxyethylene)oxy monoalkyl ethers or ethoxylated or propoxylated sulfophenyl units. Exemplary SRPs include an oligomer of terephthalic acid ethylene glycol, terephthalic acid propylene glycol, 5-sulfoisophthalic acid ethylene glycol and 5-sulfoisophthalic acid propylene glycol units, that contains end groups derived from an oligomeric poly(ethylene glycol) monomethyl ether of molecular weight 750 and about 80 mol %, based on the amount of all end groups, of sodium 2-(2-hydroxyethoxy)ethane sulfonate. These polyesters are also readily soluble in water, exhibit good soil release properties and can be readily incorporated into solid detergents and cleaning agents.

Colored polyesters are known from WO 2011/120653 A1. These are obtained by copolymerization of sulfogroup-free aromatic dicarboxylic acids or their polyester-forming derivatives, optionally sulfogroup-containing aromatic dicarboxylic acids or their polyester-forming derivatives, diols, alkylene glycol ethers and/or alkylene glycol sulfonates in the presence of pigments. The polyesters are characterized by a very good soil release effect and show a homogeneously colored and at the same time transparent appearance.

WO 2011/063945 A1 discloses polyester concentrates with high solvent stability and graying inhibiting activity. The aqueous polyester concentrates contain 12-60 wt. % of polyesters obtained by copolymerization of sulfogroup-free aromatic dicarboxylic acids or polyester-forming derivatives thereof, optionally sulfogroup-containing aromatic dicarboxylic acids or polyester-forming derivatives thereof, ethylene glycol, 1,2-propylene glycol, alkylene glycol ethers and optionally alkylene glycol sulfonates, wherein at least one component containing sulfo groups must be present and wherein the molar ratio of 1,2-propylene glycol to ethylene glycol is greater than 1.60. These polyesters are characterized by a very good soil release effect, show a good graying inhibiting effect when used in liquid detergents and have only a minimal tendency to crystallize in aqueous solution.

SRPs with high solution stability and graying inhibiting effect are known from WO 2011/063944 A1. The polyesters are obtained by copolymerization of sulfo group-free aromatic dicarboxylic acids or polyester-forming derivatives thereof, optionally sulfo group-containing aromatic dicarboxylic acids or polyester-forming derivatives thereof, ethylene glycol, 1,2-propylene glycol, alkylene glycol ethers and optionally alkylene glycol sulfonates, wherein at least one sulfo group-containing component must be present and wherein the molar ratio of 1,2-propylene glycol to ethylene glycol is greater than 1.70. These polyesters are characterized by a very good soil release effect, show a good graying inhibiting effect for textiles, have good free-flowing properties as granules and largely retain a low-viscosity consistency in dissolved form even during prolonged storage.

The polyesters described in these documents contain end groups derived from alkylene glycol ethers, which are defined over a wide range of molecular weights. However, the use of shorter chain alkylene glycol ethers is preferred.

SUMMARY OF THE INVENTION

Disclosed herein are polyesters characterized by very good soil release properties, can be readily stored in detergent and cleaning agent formulations and can be used as soil-release polymers. The object of the present invention was to provide anionic polyesters which are readily water soluble and/or dispersible, exhibit good soil release action and high dispersing capacity, are compatible with additives and adjuvants commonly used in detergent and cleaning compositions, can be stored for extended periods in detergent and cleaning composition formulations, and show no tendency to form precipitates or phase separations in liquid detergent and cleaning composition formulations containing anionic surfactants.

The polyesters used according to the invention exhibit very good soil release properties, especially with respect to oily and greasy stains, are characterized by very good dissolving behavior already at temperatures of 20° C. and can be readily presented as free-flowing, storage-stable granules and incorporated into solid and liquid preparations. Due to their anionic nature, they exhibit very good dispersing properties and thus reduce dirt deposition during the washing process.

It must be regarded as surprising that the polyesters used in accordance with the invention show excellent storage stability when incorporated into powdered detergents and cleaning agents and, in particular, into liquid detergents and cleaning agents, and do not tend to precipitate or sediment even over long periods of time and even at temperatures<25° C.

Although polyesters with ionic groups in the polymer backbone as well as with non-ionic and anionic end groups are known in principle, they often still tend to precipitate or to crystallize in a way that reduces their effectiveness, especially in liquid formulations with high anionic surfactant contents.

In the past, attempts were made to use some anionic content as end groups on the polymer backbone to elicit the benefits of anionic polyesters in washing performance. Due to the precipitation phenomena described in the preceding, it was usually not possible to incorporate such polymers in liquid detergents with sufficient stability. This was only possible if the anionic content was kept as low as possible, which, however, led to unsatisfactory washing results. The same applies to the use of sulfonate monomers in the main chain. Again, polyesters with molecular weights up to about 2,700 g/mol are soluble in liquid detergents with anionic surfactant systems. But here, too, the washing performance ultimately left much to be desired.

In addition, special combinations of diols in specific ratios or non-ionic polyalkoxy ether end groups with a low degree of condensation of typically up to 5 repeating units have been used.

None of the concepts described have yet been able to achieve polyesters with sufficiently high storage stability (precipitation) and washing performance in liquid formulations.

DETAILED DESCRIPTION OF THE INVENTION

It has now been surprisingly found that the combination of a comparatively low proportion of repeating structural units with sulfonate groups, alongside a high proportion of repeating structural units without sulfonate groups in the polymer backbone, with a sufficiently high proportion of nonionic polyalkoxy ether end groups with a high proportion of alkoxy repeating units, results in polyesters which have been shown to have very high storage stability in detergent or cleaning formulations and which give excellent soil release.

The subject matter of the invention are polyesters containing, based on all the structural units and end groups in the molecule, 4 to 30% by weight of structural units of formula (I) or of formula (II) or of formulae (I) and (II), 0.25 to 10% by weight of structural units of formula (III) or of formula (IV) or of formulae (III) and (IV), and 0 to 5% by weight of structural units of the formula (V)

$$-CO-R^1-CO-O-C_2H_4-O- \quad (I),$$

$$-CO-R^1-CO-O-(C_3H_6-O)- \quad (II),$$

$$-CO-R^2-CO-O-C_2H_4-O- \quad (III),$$

$$-CO-R^2-CO-O-(C_3H_6-O)- \quad (IV),$$

$$-CO-R^3-CO-O-R^4-O- \quad (V),$$

50 to 95% by weight of nonionic endgroups of formula (VI), and 0 to 5% by weight of nonionic endgroups of formula (VII)

$$-CO-(O-C_2H_4-)_n-OR^5 \quad (VI),$$

$$-CO-OR^6 \quad (VII),$$

wherein $R^1$ is a divalent aromatic hydrocarbon radical without sulfo groups or without salts of sulfo groups, $R^2$ is a divalent aromatic hydrocarbon radical substituted with at least one sulfo group or with the salt of a sulfo group, $R^3$ is an alkylene, cycloalkylene or arylene radical, $R^4$ is an alkylene or cycloalkylene radical, provided that the structural unit of formula (V) is different from the structural units of formulae (I), (II), (Ill) and (IV), $R^5$ is $C_1$-$C_6$ alkyl, cycloalkyl, aryl or aralkyl, $R^6$ is a monovalent organic radical, and n is a number between 30 and 500.

$R^1$ is a divalent aromatic hydrocarbon radical. This is derived from an aromatic dicarboxylic acid or its derviates, such as dicarboxylic acid esters. This is an aromatic hydrocarbon radical with two covalent bonds that provide the linkage to the rest of the molecule. The aromatic hydrocarbon radical may be unsubstituted or have one or more nonionic substituents, such as alkyl or alkoxy. In particular, $R^1$ does not contain sulfo groups or salts of sulfo groups. Examples of divalent aromatic hydrocarbon radicals include phenylene, in particular 1,3- and 1,4-phenylene.

$R^2$ is a divalent aromatic hydrocarbon radical substituted by at least one sulfo group or the salt of a sulfo group. This is also derived from an aromatic dicarboxylic acid or its derviates, such as dicarboxylic acid esters. This is an aromatic hydrocarbon radical with two covalent bonds that establish the connection to the rest of the molecule. The aromatic hydrocarbon radical has at least one sulfo group or salt thereof, preferably one or two sulfo groups or salts thereof as substituents, and may also carry one or more further substituents, such as alkyl or alkoxy. Examples of divalent aromatic hydrocarbon radicals substituted by at least one sulfo group or salt thereof are sulfophenylene, in particular 5-sulfo-1,3-phenylene, or sulfonaphthylene or the alkali metal, alkaline earth metal or ammonium salts of these radicals.

Preferably, salts of the formula $-SO_3^-$ $(Kat^{i+})_{1/i}$ are suitable as salts of a sulfo group, wherein i is 1, 2 or 3, preferably 1.

Kat is a one- to three-times charged cation. Examples are cations of alkali metals or alkaline earth metals or ammonium cations. Sodium, potassium, magnesium or calcium cations or quaternary ammonium cations are preferred.

$R^3$ is an alkylene, cycloalkylene or arylene radical. This has two covalent bonds which establish the connection to the rest of the molecule. The radical may be unsubstituted or have one or more substituents, such as alkyl or alkoxy. Examples of alkylene radicals $R^3$ are those having 2 to 8 carbon atoms. Examples of cycloalkylene radicals are those with five or six ring carbon atoms. Examples of arylene radicals are those having six to fourteen ring carbon atoms, in particular phenylene or naphthylene.

$R^4$ is an alkylene or cycloalkylene radical. It has two covalent bonds that connect it to the rest of the molecule. The radical may be unsubstituted or have one or more substituents, such as alkyl or alkoxy. Examples of alkylene radicals $R^4$ are those having 2 to 3 carbon atoms. Examples of cycloalkylene radicals are those with five or six ring carbon atoms.

$R^3$ is derived from a dicarboxylic acid or derviates thereof, such as dicarboxylic acid esters. $R^4$ is derived from a dihydric alcohol.

The combinations of $R^3$ and $R^4$ form a structural unit of formula (V). This must be selected in individual cases so that it differs from the structural units of formulae (I), (II), (III) and (IV).

$R^5$ can mean alkyl. These are alkyl groups which may be straight-chain or branched. In particular, alkyl groups have one to six carbon atoms. Preferred are methyl and ethyl, especially methyl.

$R^5$ can mean cycloalkyl. These are usually cycloalkyl groups with five to six ring carbon atoms. Cyclohexyl is particularly preferred.

$R^5$ can mean aryl. These are usually aromatic hydrocarbon radicals with five to ten ring carbon atoms. Preferred is phenyl.

$R^5$ can mean aralkyl. These are usually aryl groups linked to the rest of the molecule by an alkylene group. Preferred is benzyl.

$R^5$ is preferably $C_1$-$C_6$ alkyl, in particular methyl or ethyl.

The polyesters according to the invention contain structural units of formulae (I) and (III) or of formulae (II) and (IV) or of formulae (I), (II), (Ill) and (IV).

The proportion of structural units of formula (I) or of formula (II) or taken together of formulae (I) and (II), based on all structural units and end groups in the polyester, is 4 to 30% by weight, preferably 8 to 22% by weight, and in particular 10 to 20% by weight.

If the polyester according to the invention contains structural units of formulae (I) and (II), their molar ratio may vary in wide ranges. For example, the molar ratio of the structural units of formula (I) to the structural units of formula (II) ranges from 1:99 to 99:1, preferably from 1:4 to 4:1 and in particular from 1:4 to 1:1.

The polyesters according to the invention also contain structural units of formula (III) or of formula (IV) or of formulae (III) and (IV).

The proportion of structural units of formula (III) or of formula (IV) or taken together of formulae (III) and (IV), based on all structural units and end groups in the polyester, is 0.25 to 10% by weight, preferably 0.3 to 5.0% by weight, and in particular 0.5 to 3.0% by weight.

If the polyester according to the invention contains structural units of formulae (III) and (IV), their molar ratio may vary in wide ranges. For example, the molar ratio of the structural units of formula (III) to the structural units of formula (IV) ranges from 1:99 to 99:1, preferably from 1:4 to 4:1 and in particular from 1:4 to 1:1.

The propylene glycol units $—C_3H_6—$ in the structural units of formulae (II) and (IV) may have the structure $—CH_2—CH_2—CH_2—$ or preferably the structure $—CH(CH_3)—CH_2—$.

The polyesters according to the invention may contain structural units of formula (V).

The proportion of structural units of the formula (V), based on all structural units and end groups in the polyester, is 0 to 5% by weight, preferably 0 to 3% by weight, and in particular 0 to 1% by weight.

The structural units of formula (V) are generally derived from monomers capable of polycondensation.

Examples of structural units of formula (V) are structural units derived from aliphatic or cycloaliphatic dicarboxylic acids or their derivatives, such as dialkyl esters, and from dihydric alcohols. Examples include ethylene adipate or ethylene sebacate.

Further examples of such structural units are crosslinking structural units.

In the context of this description, crosslinking structural units are understood to be structural units that have at least three functionalities, such as oxygen or carboxylic acid bridges, and that covalently link at least two polyester chains to one another.

Crosslinking structural units in the polyesters used according to the invention may be those of formula (X)

$$—R^7—(X)_y— \quad (X)$$

wherein y is a number from 3 to 6, preferably 3, $R^7$ is a three- to six-valent organic radical, preferably a three- to six-valent alkyl or aryl radical, and X is —O— and/or —COO—.

Non-crosslinked polyesters are preferred.

The polyesters according to the invention contain end groups of formula (VI) or of formulae (VI) and (VII).

The proportion of end groups of the formula (VI), based on all structural units and end groups in the polyester, is 50 to 95% by weight, preferably 70 to 95% by weight, particularly preferred 80 to 93% by weight, and most preferred 85 to 92% by weight.

The polyesters according to the invention may contain nonionic end groups of the formula (VII). The proportion of end groups of the formula (VII), based on all structural units and end groups in the polyester, is 0 to 5% by weight, preferably 0 to 3% by weight, and in particular 0 to 1% by weight.

The polyesters according to the invention preferably have only nonionic end groups.

Preferred are polyesters in which $R^1$ is an unsubstituted phenylene or naphthylene radical, preferably a 1,3- or 1,4-phenylene radical and in particular a 1,4-phenylene radical.

Also preferred are polyesters in which $R^2$ is a phenylene or naphthylene radical substituted with one or two sulfo groups or salts thereof, in particular a 1,3-phenylene radical substituted with a sulfo group or salt thereof in the 5-position.

Further preferred are polyesters which, in addition to the end groups, contain only structural units of the formulae (II) and (IV).

Other preferred polyesters contain, in addition to the end groups, only structural units of the formulae (I), (II), (Ill) and (IV).

Particularly preferred are polyesters containing only end groups of formula (VI).

Particularly preferred are polyesters in which n is a number between 45 and 230, preferably between 55 and 140.

Particularly preferred are polyesters in which $R^5$ is $C_1$-$C_6$-alkyl, especially methyl or ethyl.

The polyesters used according to the invention are characterized by the presence of a melting range starting at at least 45° C. This melting range is distributed over a temperature interval.

The melting range is determined with the aid of a Kofler bench, on which a powder with a particle size fraction of 200-900 microns of the polyester to be tested is subjected to a temperature gradient, thereby determining a temperature at which the polyester powder begins to melt.

The melt range determination can be carried out as follows: The polyester to be tested is ground with the aid of a suitable sieve mill and the particle size fraction of 200-900 microns is freed from the fine and coarse fractions by means of a suitable sieve combination. Subsequently, a heating gradient is set on a metal support on a Kofler bench tempered to constant temperature. The polyester granules are now distributed over the entire metal surface of the bench (heating gradient). After 10 min, the Kofler bench is tilted and any solid product residues are poured off. The beginning of the melting range is characterized by the product adhering to the heated surface of the bench from a certain point onwards. At this point, the surface temperature is taken with an infrared thermometer with sufficient precision (+/−1° C.). This temperature is defined as the beginning of the melting range.

Preferred are polyesters with melting ranges starting at at least 50° C., in particular with melting ranges from 53 to 70° C.

The melting range of the polyester used according to the invention can be influenced by the selection of the type and quantity of monomers used for production and by the molecular weight corresponding to the chain length of the polyester. The measures to be taken for this purpose are known to the person skilled in the art.

Particularly preferred are polyesters which contain only end groups of formula (VI) and which, in addition to the end groups, contain only structural units of formulae (I), (II), (III) and (IV).

Highly preferred are polyesters which have only structural units of formulae (Ia) and (Va) and only end groups of formula (VI), the proportion of the structural units of formula (Ia) being 4 to 30% by weight and the proportion of the structural units of formula (Va) being 0.25 to 10% by weight and the proportion of end groups being 50 to 95% by weight, based on all structural units and end groups, or which have only structural units of formulae (Ib) and (Vb) and only end groups of formula (VI), the proportion of the structural units of formula (Ib) being from 4 to 30% by weight and the proportion of the structural units of formula (Vb) being from 0.25 to 10% by weight and the proportion of the end groups being from 50 to 95% by weight, based on all structural units and end groups, or which have only structural units of formulae (Ia), (Ib), (Va) and (Vb) and only end groups of formula (VI), the proportion of the structural units of formulae (Ia) and (Ib) taken together being 4 to 30% by weight and the proportion of the structural units of formulae (Va) and (Vb) taken together being 0.25 to 10% by weight and the proportion of the end groups being 50 to 95% by weight, based on all structural units and end groups, wherein the end groups of the formula (VI) being covalently bonded to carboxyl radicals of the polyester via an ester bond (Ia)

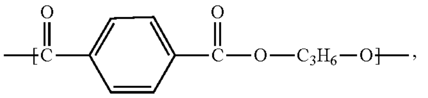

(Ib)

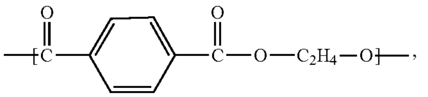

(Va)

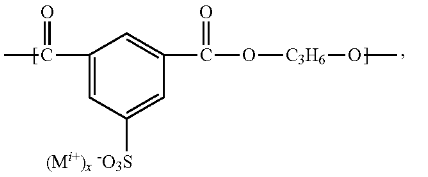

(Vb)

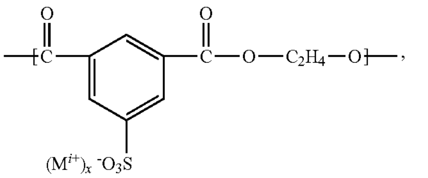

(VI)

$$—CO—(O—C_2H_4)_n—OR^5,$$

wherein $R^5$ and n have the meanings defined above,
M is hydrogen or a monovalent or divalent cation
i is 1 or 2
x is 0.5 or 1 and the product i·x=1.

The weight-average molecular weights $M_w$ of the polyesters of the invention are generally in the range from 3,500 g/mol to 20,000 g/mol, preferably 4,000 g/mol to 16,000 g/mol, particularly preferably 5,000 g/mol to 15,000 g/mol.

The desired molecular weights can be generated by selecting the ratios of the individual monomers to one another. This procedure is known to those skilled in the art.

The weight average of the molecular weights is determined by size exclusion chromatography. This is preferably carried out in a mixture of water and acetonitrile, with calibration using sulfonated polystyrene standards with narrow molecular weight distribution. Narrow molecular weight distribution here means a polydispersity D ($M_w/M_n$) of less than 1.5.

Other preferred polyesters are characterized in that they can be presented as aqueous solutions with a polyester content by weight of 5.0 to 80.0% by weight, preferably 10.0 to 75.0% by weight and particularly preferred 50.0 to 70.0% by weight, in each case based on the total weight of the aqueous solution.

The synthesis of the polyesters used according to the invention is carried out by methods known per se, in that the monomers required to build up the desired polyester and optionally one or more pigments are first pre-esterified with the addition of a catalyst, as well as with a salt of a short-chain carboxylic acid, preferably acetate, at normal pressure at temperatures of 160 to about 220° C. using an inert atmosphere.

Subsequently, the desired molecular weights can be built up in vacuo at temperatures from 160 to about 240° C. by distilling off superstoichiometric amounts of the glycols used.

The known transesterification and condensation catalysts of the prior art, such as titanium tetraisopropylate, dibutyltin oxide, alkali metal or alkaline earth metal alcoholates or antimony trioxide/calcium acetate, are suitable for the reaction.

With regard to further details on carrying out the polycondensation, reference is made to EP 442 101 A1.

For the preparation of the polyesters used according to the invention, the monomers of the formulae (XI), (XII) and (XIIIa) and/or (XIIIb) can be polycondensed together with the end group-forming monomers of the formula (XIV)

$$RO—OC—R^1—CO—OR \quad (XI),$$

$$RO—OC—R^2—CO—OR \quad (XII),$$

$$OH—C_2H_4—OH \quad (XIIIa),$$

$$OH—C_3H_6—OH \quad (XIIIb),$$

$$H—(O—C_2H_2)_n—OR^5 \quad (XIV),$$

wherein $R^1$, $R^2$, $R^5$ and n are as defined above and R is hydrogen or alkyl.

Optionally, in addition to the polyester-forming monomers corresponding to formulae (XI), (XII), (XIIIa) and/or (XIIIb) additional polyester-forming monomers corresponding to formulae (XV) and/or (XVI) may be added $$RO—OC—R^3—CO—OR \quad (XV),$$

$$HO—R^4—OH \quad (XVI),$$

wherein $R^3$ and $R^4$ are as defined above and R is hydrogen or alkyl.

Optionally, in addition to the end group-forming monomers of the formula (XIV), further end group-forming monomers of the formula (XVII) may be added $$HO—R^6 \quad (XVII),$$

wherein $R^6$ is as defined above.

The individual monomers are added to the reaction mixture in such amounts that the polyesters formed have the proportions of structural units as indicated above.

Preferably, at the beginning of the reaction, the reaction mixture contains diol of formulae (XIIIa) and/or (XIIIb) in excess to the amount of dicarboxylic acid (derivatives) of formulae (XI) and (XII).

Preferably, the preparation of the polyesters used according to the invention is carried out by reaction of a) dimethyl terephthalate,
b) sulfoisophthalic acid dimethyl ester,
c) ethylene glycol or propylene glycol or a mixture of ethylene glycol and propylene glycol, and
d) polyethylene glycol monomethyl ether and/or polypropylene glycol monomethyl ether having a weight average molecular weight in the range from 1.500 to 20.000 g/mol, preferably from 2.000 to 10.000 g/mol and in particular from 2.500 to 6.000 g/mol.

Preferably, 1,2-propylene glycol is used as propylene glycol.

The structural units of the formula (I) can be obtained by reacting the above-mentioned component a) dimethyl terephthalate with component c) ethylene glycol; the structural units of the formula (II) can be obtained by reacting the above-mentioned component a) dimethyl terephthalate with component c) propylene glycol; the structural units of the formula (III) can be obtained by reacting the above-mentioned component b) sulfoisophthalic acid dimethyl ester with component c) ethylene glycol; and the structural units of the formula (IV) can be obtained by reacting the above-mentioned component b) sulfoisophthalic acid dimethyl ester with component c) propylene glycol.

The end groups of formula (VI) can be obtained by reacting the above-mentioned component d) polyethylene glycol monomethyl ether with carboxyl end groups of the polyester; the end groups of formula (VII) can be obtained by reacting the above-mentioned component d) polypropylene glycol monomethyl ether with carboxyl end groups of the polyester.

The polycondensation may take place in the presence or preferably in the absence of one or more crosslinking compounds, for example compounds of formula (XVIII)

$$R^7—(X—R)_y \quad (XVIII),$$

wherein y, $R^7$, R and X have the meanings defined above.

If crosslinking agents are present during the polycondensation, they are preferably used in amounts of from 0.00001 to 0.1 mol, in particular from 0.00002 to 0.01 mol, and very preferred from 0.00005 to 0.0001 mol per mol of acid (derivatives) of the formulae (XI) and (XII).

The polyesters can be incorporated in the detergents and cleaning agents of the invention in various dosage forms.

The detergents and cleaning agents according to the invention may be in the form of granules, tablets, gels, aqueous dispersions or aqueous solutions.

The invention also relates to the use of the polyesters described above as components in detergents and cleaning agents, in textile care agents and in agents for finishing textiles.

The invention also relates to the use of the polyesters described above as soil-release polymers in detergents and cleaning agents.

The polyesters used according to the invention impart significantly improved soil release properties to textile fibers and substantially support the soil release capacity of the other components of detergents and cleaning agents against oily, greasy or pigment soilings.

A further advantage can be the use of the polyesters used according to the invention in after-treatment agents for laundry, for example in a fabric softener.

With the aid of the polyesters used according to the invention in cleaning agents for surfaces, in particular for hard surfaces, the treated surfaces can be given a soil-repellent finish.

Detergent and cleaning formulations in which the polyesters described above are used can be in the form of powders, granules, tablets, pastes, gels or liquids.

Particularly preferred, the polyesters described above are used in paste-, gel- or, in particular, liquid-form detergents and cleaners. The polyesters remain completely dissolved in these detergents and are characterized by exceptionally good soil release properties.

The polyesters described above are also preferably used in powder detergents and cleaners. In these, the polyesters are also particularly stable in storage and have exceptionally good soil release properties.

Examples of detergents and cleaning agents according to the invention are heavy-duty detergents, mild detergents, color detergents, wool detergents, curtain detergents, modular detergents, washing tablets, bar soaps, stain salts, laundry starches and stiffeners and ironing aids.

In particular, the polyesters according to the invention are suitable for use in in so-called monodose systems and detergent concentrates.

The polyesters described above can also be incorporated in household cleaning agents, for example in all-purpose cleaners, or in dishwashing detergents, in carpet cleaning and impregnating agents, in cleaning and care agents for floors and other hard surfaces, e.g. made of plastic, ceramics, glass or surfaces coated with nanotechnology.

Examples of technical cleaning agents are plastic cleaning and care agents, for example for housings and car fittings, and cleaning and care agents for painted surfaces such as car bodies.

The washing and cleaning compositions equipped according to the invention generally contain at least 0.1% by weight, preferably between 0.1 and 5% by weight and particularly preferred 0.3 to 1% by weight of the polyesters, based on the finished compositions.

Depending on the intended application, the composition of the formulations must be adapted to the nature of the textiles to be treated or washed or the surfaces to be cleaned.

The detergents and cleaners according to the invention may contain common ingredients such as surfactants, emulsifiers, builders, bleach catalysts and bleach activators, sequestering agents, graying inhibitors, color transfer inhibitors, color fixing agents, enzymes, optical brighteners or softening components. In addition, formulations or parts of the formulation in the sense of the invention can be selectively colored and/or perfumed by dyes and/or fragrances.

Liquid detergents containing the polyesters of the invention and 10 to 40% by weight, based on the total amount of the liquid detergent, of anionic surfactant or mixtures of anionic surfactants are particularly preferred.

EXAMPLES

The following examples are intended to explain the invention without limiting it. All percentages are to be understood as percent by weight (wt %), unless explicitly stated otherwise.

Example 1 (Polyester According to the Invention)

In a 2 liter four-neck flask equipped with a KPG stirrer, internal thermometer, gas introduction tube and distillation bridge, 194.19 g (1 mol) of dimethyl terephthalate, 74 g (0.25 mol) of 5-sulfoisophthalic acid dimethyl ester sodium salt, 31 g (0.5 mol) of ethylene glycol and 152 g (2 mol) of 1,2-propylene glycol were successively introduced. Then 1000 g (0.5 mol) of poylyethylene glycol monomethyl ether 2000 was added to the reaction mixture.

The reaction mixture was then inerted by introducing nitrogen. Subsequently, 0.4 g titanium tetraisopropylate and 0.5 g sodium acetate were added to the reaction mixture in countercurrent. The mixture was heated to about 165° C. and kept at temperature for one hour. At this temperature, transesterification began. The resulting methanol was distilled off using a light stream of nitrogen.

Two hours after the start of distillation, the temperature was increased to 210° C. within 1 h. The temperature was kept at this level. After the reaction time was completed, the temperature was cooled to below 195° C. and the pressure was reduced to 10 mbar within 30 min. During the ensuing two h vacuum distillation, condensation was completed by distilling off the excess alcohol. The vacuum was reduced to 1 mbar for a further 30 minutes, followed by aeration with nitrogen and discharge of the melt onto suitable plates.

Examples 2 to 22 (Polyesters According to the Invention) and Comparative Examples V-1 to V-4

One proceeds as indicated in the preparation of the polyester in Example 1 and reacted the components listed in Table I below with each other.

In all cases, 0.4 g of titanium tetraisopropylate was used as transesterification catalyst and 0.35 g of sodium acetate as auxiliary catalyst.

Polyesters with compositions according to Table II were obtained.

TABLE I of the starting materials for the manufacture of the polyesters of Examples 1 to 22 and of the Comparative Examples V1 to V4

| Example No.. | 5-SIM*) (mol) | DMT*) (mol) | EG*) (mol) | PG*) (mol) | MPEG 750*) (mol) | MPEG 2000*) (mol) | MPEG 5000*) (mol) | MPEG 250*) (mol) |
|---|---|---|---|---|---|---|---|---|
| 1 | 0.25 | 1 | 0.5 | 2 | — | 0.5 | — | — |
| 2 | 1 | 4 | 1 | 8 | — | 2 | — | — |
| 3 | 1 | 4 | 0 | 8 | — | 2 | — | — |
| 4 | 1 | 4 | 4 | 8 | — | — | 2 | — |
| 5 | 1 | 4 | 4 | 8 | — | — | 1.8 | — |
| 6 | 1 | 4 | 4 | 8 | — | — | 1.6 | — |
| 7 | 1 | 4 | 4 | 8 | — | — | 1.4 | — |
| 8 | 1 | 4 | 4 | 8 | — | — | 1.2 | — |
| 9 | 1 | 4 | 4 | 8 | — | — | 1 | — |
| 10 | 1.1 | 4 | 4 | 8 | — | — | 2 | — |
| 11 | 1.2 | 4 | 4 | 8 | — | — | 2 | — |
| 12 | 1.3 | 4 | 4 | 8 | — | — | 2 | — |
| 13 | 1.4 | 4 | 4 | 8 | — | — | 2 | — |
| 14 | 1.5 | 4 | 4 | 8 | — | — | 2 | — |
| 15 | 0.8 | 4 | 4 | 8 | — | — | 1.4 | — |
| 16 | 0.6 | 4 | 4 | 8 | — | — | 1.4 | — |
| 17 | 0.4 | 4 | 4 | 8 | — | — | 1.4 | — |
| 18 | 0.2 | 4 | 4 | 8 | — | — | 1.4 | — |
| 19 | 0.6 | 4 | 2 | 8 | — | — | 1.4 | — |
| 20 | 0.6 | 4 | 1 | 8 | — | — | 1.4 | — |
| 21 | 0.6 | 4 | — | 8 | — | — | 1.4 | — |
| 22 | 0.6 | 4 | — | 8 | — | — | 1.4 | — |
| V-1 | 1.32 | 4 | 15.2 | 7.6 | 0.18 | 0.06 | — | — |

TABLE I-continued of the starting materials for the manufacture of the polyesters of Examples 1 to 22 and of the Comparative Examples V1 to V4

| Example No.. | 5-SIM*) (mol) | DMT*) (mol) | EG*) (mol) | PG*) (mol) | MPEG 750*) (mol) | MPEG 2000*) (mol) | MPEG 5000*) (mol) | MPEG 250*) (mol) |
|---|---|---|---|---|---|---|---|---|
| V-2 | 1.32 | 4 | 15.2 | 7.6 | 0.12 | 0.12 | — | — |
| V-3[1)] | 0.8 | 5 | 3.7 | 3.7 | — | — | — | 1 |
| V-4 | 0.5 | 4 | — | 12 | 1.9 | — | — | — |

*)5-SIM = 5-sulfoisophthalic acid dimethylester sodium salt
*)DMT = dimethylterephthalate
*)EG = ethyleneglycol
*)PG = 1,2-propyleneglycol
*)MPEG 250 = polyethyleneglycol monomethylether molecular weight 250 g/mol
*)MPEG 750 = polyethyleneglycol monomethylether molecular weight 750 g/mol
*)MPEG 2000 = polyethyleneglycol monomethylether molecular weigth 2000 g/mol
*)MPEG 5000 = polyethyleneglycol monomethylether molecular weigth 5000 g/mol
1)Example 1 of WO 2008/110318 A2

TABLE II

Composition of the polyesters of Examples 1 to 22 and of Comparative Examples V-1 to V-4

| Example No.. | 5-SIM*) (mol) | DMT*) (mol) | EG*) (mol) | PG*) (mol) | mean chain length**) (mol) | proportion of end groups (weight-%) |
|---|---|---|---|---|---|---|
| 1 | 1.0 | 4 | 0.8 | 3.2 | 5046.7 | 78.90 |
| 2 | 1.0 | 4 | 0.4 | 3.6 | 5051.1 | 78.83 |
| 3 | 1.0 | 4 | 0.0 | 4.0 | 5057.1 | 78.74 |
| 4 | 1.0 | 4.0 | 1.3 | 2.7 | 11039.7 | 90.42 |
| 5 | 1.1 | 4.4 | 1.5 | 3.0 | 11163.2 | 89.42 |
| 6 | 1.3 | 5.0 | 1.8 | 3.5 | 11317.6 | 88.20 |
| 7 | 1.4 | 5.7 | 2.0 | 4.1 | 11506.1 | 86.68 |
| 8 | 1.7 | 6.7 | 2.4 | 4.9 | 11780.7 | 84.73 |
| 9 | 2.0 | 8.0 | 3.0 | 6.0 | 12151.2 | 82.15 |
| 10 | 1.1 | 4.0 | 1.4 | 2.7 | 11070.1 | 90.17 |
| 11 | 1.2 | 4.0 | 1.4 | 2.8 | 11100.5 | 89.92 |
| 12 | 1.3 | 4.0 | 1.4 | 2.9 | 11130.9 | 89.68 |
| 13 | 1.4 | 4.0 | 1.5 | 2.9 | 11161.3 | 89.43 |
| 14 | 1.5 | 4.0 | 1.5 | 3.0 | 11191.7 | 89.19 |
| 15 | 1.1 | 5.7 | 2.0 | 3.9 | 11429.3 | 87.34 |
| 16 | 0.9 | 5.7 | 1.9 | 3.7 | 11342.4 | 88.01 |
| 17 | 0.6 | 5.7 | 1.8 | 3.5 | 11255.6 | 88.68 |
| 18 | 0.3 | 5.7 | 1.7 | 3.3 | 11168.7 | 89.37 |
| 19 | 0.9 | 5.7 | 1.1 | 4.5 | 11352.1 | 87.93 |
| 20 | 0.9 | 5.7 | 0.6 | 5.0 | 11358.5 | 87.88 |
| 21 | 0.9 | 5.7 | 0.0 | 5.6 | 11366.6 | 87.82 |
| 22 | 0.9 | 5.7 | 0.0 | 5.6 | 11366.6 | 87.82 |
| V-1 | 11.0 | 33.3 | 28.9 | 14.4 | 11950.2 | 17.73 |
| V-2 | 11.0 | 33.3 | 28.9 | 14.4 | 12571.2 | 21.80 |
| V-3 | 1.6 | 10.0 | 5.3 | 5.3 | 2910.1 | 16.56 |
| V-4 | 0.5 | 4.2 | 0 | 3.7 | 2403.0 | 61.67 |

*)Legend compare Table 1
**)determined by theoretical calculation based on composition

Application Examples

The polyesters according to the invention were compared for their soil release effect with a prior art soil release polymer.

For this purpose, the polyesters were added in concentrations of 1% (active ingredient), based on the detergent formulation, to IEC-A standard detergent according to the formulation of WfK (order code: 88010-1), and the test fabrics WFK 30A PES (Wäschereiforschungsanstalt Krefeld) were prewashed with it at 40° C. for 30 minutes 3 times. The fabrics pretreated in this way were dried and soiled with used motor oil (with 25 µl per test cloth). After an exposure time of 1 hour, the test rags were washed without addition of the polyester according to the invention (reference) and with addition (1 wt %) of the polyesters according to the invention as soil release polymers or with addition of a prior art soil release polyester. Subsequently, the remission of the test fabrics was measured using an Elephro test device with an edge filter of 400 nm at a wavelength of 457 nm.

TABLE III

Washing results with the polyesters according to the invention compared to prior art Soil Release polyesters in WfK's IEC-A standard detergent, Dirty Motor Oil (DMO) test on the test fabric WFK 30A PES at 40° C. wash temperature.

| IEC-A standard detergent of WfK without additive +1% Soil Release Polymer: | remission (%) 23.3 |
|---|---|
| WeylClean ® PSA 1 | 29.7 |
| Polyester of invention, Example 1 | 42.3 |
| Polyester of invention, Example 7 | 41.9 |
| Polyester of invention, Example 22 | 41.9 |
| polyester, Example V-3*) | 28.8 |
| polyester, Example V-4*) | 29.2 |

*)Polyester was unstable in liquid detergent formulations and prone to Precipitation

TABLE IV

| Washing Conditions | |
|---|---|
| Washing Machine: | Linitest, 3x pre-equipped |
| Water Hardness: | 15° dH |
| Ca:Mg | 3:2 |
| Lapping WFK 30A PES, 25 µl motor oil per lapping | 4 |
| Washing temperature | 40° C. |
| Wash time: | 30 Min. |
| Detergent concentration: | 5.0 g/L |

The invention claimed is:

1. Polyesters, based on all the structural units and end groups in the molecule, comprising 4 to 30% by weight of structural units of formula (I) or of formula (II) or of formulae (I) and (II), 0.25 to 10% by weight of structural units of formula (III) or of formula (IV) or of formulae (III) and (IV), and 0 to 5% by weight of structural units of formula (V)

Wherein the following structural units represent the formulae (I through VII):

$$—CO—R^1—CO—O—C_2H_4—O— \quad (I),$$

$$—CO—R^1—CO—O—(C_3H_6—O)— \quad (II),$$

$$—CO—R^2—CO—O—C_2H_4—O— \quad (III),$$

$$—CO—R^2—CO—O—(C_3H_6—O)— \quad (IV),$$

$$—CO—R^3—CO—O—R^4—O— \quad (V),$$

50 to 95% by weight of nonionic endgroups of formula (VI), and 0 to 5% by weight of nonionic endgroups of formula (VII)

$$—CO—(O—C_2H_4—)_n—OR^5 \quad (VI),$$

$$—CO—OR^6 \quad (VII),$$

and wherein further:

$R^1$ is a divalent aromatic hydrocarbon radical without sulfo groups or without salts of sulfo groups, $R^2$ is a divalent aromatic hydrocarbon radical substituted with at least one sulfo group or with the salt of a sulfo group, $R^3$ is an alkylene, cycloalkylene or arylene radical, $R^4$ is an alkylene or cycloalkylene radical, provided that the structural unit of formula (V) is different from the structural units of formulae (I), (II), (III) and (IV), $R^5$ is $C_1$-$C_6$ alkyl, cycloalkyl, aryl or aralkyl, $R^6$ is a monovalent organic radical, and n is a number between 55 and 500.

2. Polyesters according to claim 1, wherein $R^1$ is a phenylene or naphthylene radical.

3. Polyesters according to of claim 1 wherein $R^2$ is a phenylene or naphthylene radical substituted by one or two sulfo groups or salts thereof.

4. Polyesters according to claim 1 containing structural units of the formulae (II) and (IV) in addition to the end groups.

5. Polyesters according to claim 1 containing structural units of the formulae (I), (II), (III) and (IV) in addition to the end groups.

6. Polyesters according to claim 1 containing only end group of the formula (VI).

7. Polyesters according to claim 1, wherein n is a number between 55-140.

8. Polyesters according to claim 1, wherein $R^5$ is $C_1$-$C_6$-alkyl.

9. Polyesters according to claim 1 having a melting range starting at 45° C. or higher.

10. Polyesters according to claim 1 containing end groups of the formula (VI) and, in addition to the end groups, containing structural units of the formulae (I), (II), (III) and (IV).

11. Polyesters according to claim 1 having structural units of formulae (Ia) and (Va) and end groups of formula (VI), the proportion of structural units of the formula (Ia) being 4 to 30% by weight and the proportion of structural units of the formula (Va) being 0.25 to 10% by weight and the proportion of end groups being 50 to 95% by weight, based on all structural units and end groups, or having structural units of formulae (Ib) and (Vb) and end groups of formula (VI), the proportion of the structural units of the formula (Ib) being from 4 to 30% by weight and the proportion of the structural units of the formula (Vb) being from 0.25 to 10% by weight and the proportion of the end groups being from 50 to 95% by weight, based on all the structural units and end groups, or having structural units of formulae (Ia), (Ib), (Va) and (Vb) and end groups of formula (VI), the proportion of the structural units of the formulae (Ia) and (Ib) together being 4 to 30% by weight and the proportion of the structural units of the formulae (Va) and (Vb) together being 0.25 to 10% by weight and the proportion of the end groups being 50 to 95% by weight, based on all structural units and end groups, the end groups of the formula (VI) being covalently bonded to carboxyl radicals of the polyester via an ester linkage (Ia)

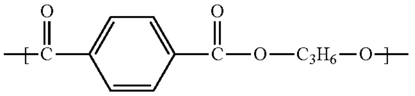, (Ib)

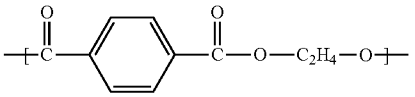, (Va)

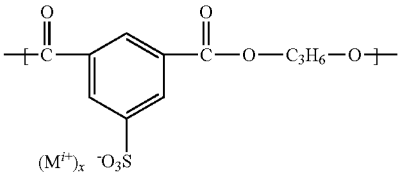, (Vb)

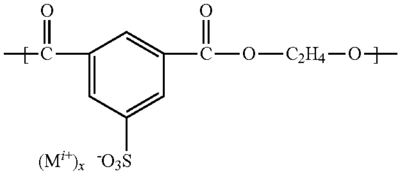, (VI)

$$—CO—(O—C_2H_4)_n—OR^5,$$

wherein $R^5$ and n are as defined in claim 1,

M is hydrogen or a monovalent or divalent cation, i is 1 or 2 x is 0.5 or 1 and the product i·x=1.

12. A detergent or cleaning composition comprising at least one polyester according to claim 1.

13. The detergent or cleaning composition according to claim 12 which is a liquid detergent.

14. The detergent or cleaning composition according to claim 13 containing 10 to 40% by weight, based on the total amount of the liquid detergent, of anionic surfactant or of mixtures of anionic surfactants.

15. The detergent or cleaning composition according to claim 12 which is a detergent and is in powder form or in the form of a tablet.

16. The process of using the polyesters according to claim 1 as soil release polymers or as graying inhibitors in detergents and cleaning compositions, textile care compositions and compositions for finishing textiles.

17. Polyesters according to claim 1, wherein $R^1$ is a 1,3 radical.

18. Polyesters according to claim 1 wherein $R^2$ is a 1,3-phenylene radical substituted in the 5-position by a sulfo group or the salt of a sulfo group.

19. Polyesters according to claim 1, wherein $R^5$ is methyl.

* * * * *